G. B. BASSETT.
WATER METER CONNECTION.
APPLICATION FILED JULY 20, 1908.

953,505.

Patented Mar. 29, 1910.

Witnesses
Chas. M. Harrington
Charles H. Bassett

Inventor
George B. Bassett

UNITED STATES PATENT OFFICE.

GEORGE B. BASSETT, OF BUFFALO, NEW YORK.

WATER-METER CONNECTION.

953,505.

Specification of Letters Patent. Patented Mar. 29, 1910.

Application filed July 20, 1908. Serial No. 444,449.

*To all whom it may concern:*

Be it known that I, GEORGE B. BASSETT, a citizen of the United States, residing at Buffalo, in the county of Erie and State of New York, have invented a new and useful Water-Meter Connection, of which the following is a specification.

My invention relates more particularly to connecting a water meter in a horizontal position to a vertical service pipe and the objects of my improvements are, first—to provide a permanent fitting in a service pipe to which a water meter may be conveniently attached and detached without disturbing the pipe or its alinement. Second—to provide fittings for conveniently connecting a water meter having inlet and outlet spuds in axial horizontal alinement to a vertical service pipe. Third—to provide a receptacle for holding a strainer and any gravel or other foreign substances that may collect about it so that they may be readily removed, and fourth—to provide a sealing device for the connection. I attain these objects by the devices illustrated in the accompanying drawings, in which—

Figure 1:
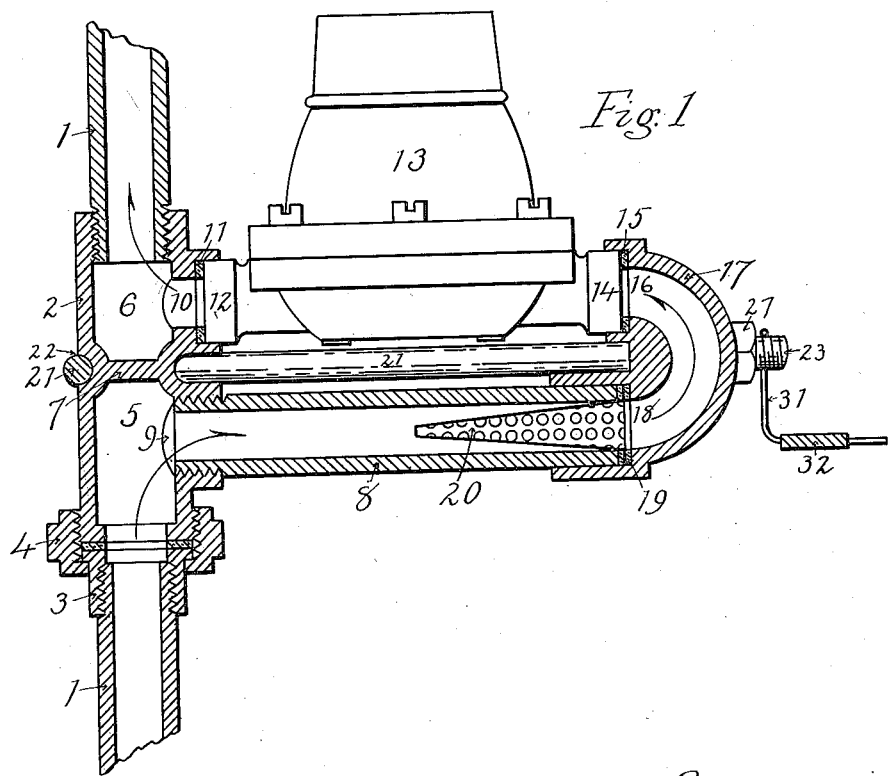
Figure 2:
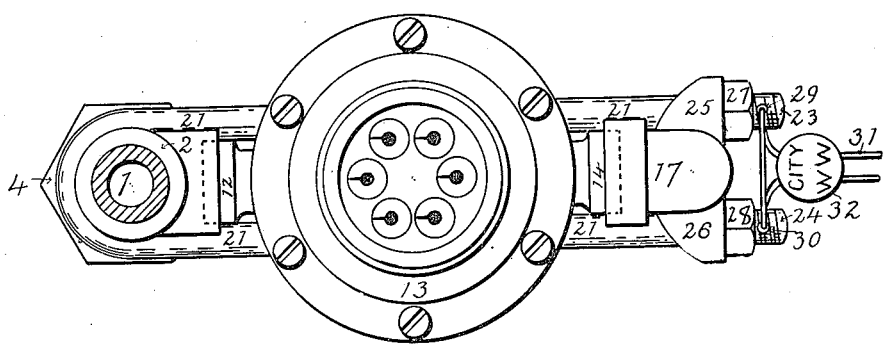

Figure 1 is a vertical section of the entire device and Fig. 2, a top view of the same.

Similar numerals refer to similar parts in each view.

1 is a vertical service pipe in which is inserted the special fitting 2 which is provided with union coupling spigot 3 and coupling nut 4, so that the usual threaded joints may be properly made. Special fitting 2 is divided into two compartments 5 and 6 by septum 7. Horizontal tube 8 is connected to compartment 5 through side outlet 9 by a threaded joint, by which it may be adjusted in or out to correspond with the length of meter 13. Vertically over outlet 9, and with its axis in the same plane as axis of outlet 9, is side outlet 10 provided with a recess in which is located leather or rubber washer 11 and which also receives the outlet spud 12 of meter 13.

Inlet spud 14 of meter 13, and washer 15 are received by the recessed part of opening 16 in bent tube 17, which connects the outlet end of tube 8 with the meter inlet spud. At the lower part of bent tube 17 is opening 18, the elongated recessed part of which receives washer 19 and the outer end of horizontal tube 8 in which is placed removable cone strainer 20. The object of elongating the recess in opening 18 is to give a telescopic supporting joint to bent tube 17 while meter is being put in place.

U clamp 21 is passed around special fitting 2 in circular groove 22 and its ends 23 and 24 passed through lugs 25 and 26 formed on the sides of bent tube 17 and are threaded to receive clamping nuts 27 and 28, by tightening which the meter and also the strainer are clamped and held in place.

29 and 30 are holes in the ends of U clamp 21, in which the sealing wire 31 is placed and then sealed by soft metal seal 32.

Having thus described my invention, what I claim and desire to secure by Letters Patent is—

1. The combination with a special fitting mounted in a service pipe and having an opening and a separate compartment at each end to which the service pipe is attached, two side outlets both facing the same way and each communicating with one of said compartments, and a water meter having inlet and outlet spuds in axial alinement on opposite sides of said meter, one spud being attached to one of said side outlets, of piping lying wholly outside of said meter and connecting the other spud of said meter to the other side outlet of said fitting; substantially as and for the purpose described.

2. The combination with a special fitting having openings in vertical axial alinement to which a vertical service pipe is attached, a septum dividing the interior space of said fitting into an upper compartment and a lower compartment, two vertically alined side outlets each communicating with one of said compartments, a water meter having inlet and outlet spuds in axial horizontal alinement, one of which spuds is attached directly to one of said outlets, of a bent tube and a horizontal tube connecting the other spud to the other outlet; substantially as and for the purpose described.

3. The combination with a special fitting having openings to which a service pipe is attached, a septum dividing the interior of said fitting into two compartments, two circular side outlets both facing the same way each communicating with one of said compartments, a water meter having inlet and outlet spuds in axial alinement attached directly to one of said outlets, a bent tube and a tube parallel to the axis of said meter spuds connecting said water meter to the other outlet, of a strainer removably mounted in said parallel tube; substantially as and for the purpose described.

4. The combination with a special fitting having openings to which a service pipe is attached, a septum dividing the interior of said fitting into two compartments, two circular side outlets each communicating with one of said compartments, a water meter having inlet and outlet spuds in axial alinement, one of said spuds being attached directly to one of said outlets, piping connecting the other spud of said meter to the other outlet, of a clamp adapted to hold said piping against one spud of said water meter and said fitting against the other spud of said meter together; substantially as and for the purpose described.

5. The combination with a special fitting having openings to which a service pipe is attached, a septum dividing the interior of said fitting into two compartments, two side outlets each communicating with one of said compartments, a water meter having inlet and outlet spuds in axial alinement on opposite sides of said meter, one of which spuds is attached directly to one of said outlets, a bent tube and a tube parallel with the axis of said meter spuds connecting the other spud to the other outlet, of a clamp adapted to clamp said meter between said fitting and said bent tube; substantially as and for the purpose described.

6. The combination with a special fitting having openings to which a service pipe is permanently attached, a septum dividing the interior of said fitting into two compartments, two side outlets each communicating with one of said compartments, a water meter and piping removably attached to said outlets, a clamp adapted to hold said meter said piping and said fitting together, of a seal for sealing said clamp; substantially as and for the purpose described.

7. The combination with a special fitting having openings to which a service pipe is attached, a septum dividing the interior of said fitting into two compartments, two separate side outlets each communicating with one of said compartments, of a water meter with inlet and outlet spuds in axial alinement on opposite sides of said meter attached directly to one of said outlets, a tube attached directly to the other of said outlets and parallel with the axial line of said meter spuds, a compression joint in contact with one spud of said meter, a second compression joint in contact with one end of said parallel tube, a bent tube connecting one spud of said meter with one end of said parallel tube and a clamp adapted to compress both compression joints at once; substantially as and for the purpose described.

8. The combination with a special fitting mounted in a service pipe and having an opening and a separate compartment at each end to which the service pipe is attached, two side outlets both facing the same way and each communicating with one of said compartments, a water meter having inlet and outlet spuds in axial alinement and having one spud attached directly to one of said side outlets and piping lying wholly outside of said meter connecting the other spud to the other side outlet, of a compression joint in contact with one spud of said meter and a second compression joint in contact with said connecting pipe and located in a plane parallel with said first compression joint; substantially as and for the purpose described.

GEORGE B. BASSETT.

Witnesses:
CLIFFORD W. HALL,
A. E. VINER.